(12) United States Patent
Stahl et al.

(10) Patent No.: US 8,943,523 B2
(45) Date of Patent: Jan. 27, 2015

(54) SYSTEM AND METHOD FOR MANAGING OUT OF COVERAGE BROADCASTS

(75) Inventors: Thomas Anthony Stahl, Indianapolis, IN (US); Darrel Wayne Randall, Danville, IN (US); Aaron Michael Smith, Noblesville, IN (US)

(73) Assignee: Thomson Licensing, Issy-les moulineaux (FR)

( * ) Notice: Subject to any disclaimer, the term of this patent is extended or adjusted under 35 U.S.C. 154(b) by 216 days.

(21) Appl. No.: 13/699,354

(22) PCT Filed: May 25, 2011

(86) PCT No.: PCT/US2011/037861
§ 371 (c)(1),
(2), (4) Date: Jan. 30, 2013

(87) PCT Pub. No.: WO2011/150026
PCT Pub. Date: Dec. 1, 2011

(65) Prior Publication Data
US 2013/0205310 A1    Aug. 8, 2013

Related U.S. Application Data

(60) Provisional application No. 61/348,007, filed on May 25, 2010.

(51) Int. Cl.
| | |
|---|---|
| *H04N 7/16* | (2011.01) |
| *H04N 7/18* | (2006.01) |
| *H04N 21/2543* | (2011.01) |
| *G06Q 20/12* | (2012.01) |
| *G06Q 20/32* | (2012.01) |

(Continued)

(52) U.S. Cl.
CPC ......... *H04N 21/2543* (2013.01); *G06Q 20/123* (2013.01); *G06Q 20/32* (2013.01);

(Continued)

(58) Field of Classification Search
CPC ................. H04N 21/2543; H04N 21/2146
USPC ................................... 725/5, 8, 74
See application file for complete search history.

(56) References Cited

U.S. PATENT DOCUMENTS

| | | |
|---|---|---|
| 5,801,751 A | 9/1998 | Sklar et al. |
| 6,658,661 B1 | 12/2003 | Arsenault et al. |

(Continued)

FOREIGN PATENT DOCUMENTS

| | | |
|---|---|---|
| CN | 1220462 | 6/1999 |
| JP | 2005-294962 | 10/2005 |

(Continued)

OTHER PUBLICATIONS

Elshenawy, Mohamed, et al., "Scalable and Location-Aware ITS Content Management in Vehicular Environments", 2010 IEEE Intelligent Vehicles Symposium, Jun. 21-24, 2010, pp. 627-633.

*Primary Examiner* — Ricky Chin
(74) *Attorney, Agent, or Firm* — Robert D. Shedd; Reitseng Lin (57) ABSTRACT

A mobile content distribution system in an airplane, a train, or a bus is capable of receiving wireless broadcast channels from a wireless service provider. The system offers a user purchase of wireless services including one or more broadcast channels provided by the wireless service provider, receives information indicative of a route from an originating location to a destination location, and determines if the content distribution system is authorized to receive services from the wireless service provider according to the information; and if the content distribution system is not authorized to receive services from the wireless service provider according to the information, the system provide a refund to the user. If the system is within an authorized area, the system determines if the system is authorized to provide full service from the wireless service provider according to the information and if the system is not authorized to provide full service, the system provides a partial refund to the user.

10 Claims, 4 Drawing Sheets

(51) Int. Cl.
*H04H 20/62* (2008.01)
*H04L 29/06* (2006.01)
*H04W 4/00* (2009.01)
*H04W 4/04* (2009.01)
*H04N 21/482* (2011.01)
*H04H 40/72* (2008.01)
*H04H 40/90* (2008.01)

(52) U.S. Cl.
CPC .............. *H04H 20/62* (2013.01); *H04L 63/10* (2013.01); *H04W 4/003* (2013.01); *H04W 4/046* (2013.01); *H04N 21/482* (2013.01); *H04H 40/72* (2013.01); *H04H 40/90* (2013.01); *H04H 2201/60* (2013.01); *H04L 2463/101* (2013.01)
USPC ...................................... 725/5; 725/8; 725/74

(56) References Cited

U.S. PATENT DOCUMENTS

| | | |
|---|---|---|
| 6,785,551 B1 | 8/2004 | Richard |
| 2001/0013058 A1 | 8/2001 | Inoue |
| 2005/0071666 A1 | 3/2005 | Chu et al. |
| 2005/0124319 A1 | 6/2005 | Williams et al. |
| 2006/0212909 A1 | 9/2006 | Girard et al. |

FOREIGN PATENT DOCUMENTS

| | | |
|---|---|---|
| JP | 2006-279860 | 10/2006 |
| JP | 2007-108688 | 7/2007 |
| KR | 10-0806496 | 2/2008 |
| WO | 02/071756 A1 | 9/2002 |
| WO | 2006/109955 A1 | 10/2006 |
| WO | 2007/148212 A2 | 12/2007 |

SYSTEM AND METHOD FOR MANAGING OUT OF COVERAGE BROADCASTS

CROSS-REFERENCE TO RELATED APPLICATIONS

This application claims the benefit, under 35 U.S.C. §365 of International Application PCT/US2011/037861, filed May 25, 2011, which was published in accordance with PCT Article 21(2) on Dec. 1, 2011 in English and which claims the benefit of U.S. provisional patent application No. 61/348,007, filed May 25, 2010.

BACKGROUND OF THE INVENTION

1. Field of the Invention

The present invention generally relates to a system and method for providing wireless broadcast and/or locally stored entertainment services on a people transporter, such as an airplane, a bus, or a train, and more particularly to a system and method for providing offers and refunds for purchasing these services to a user according to the route information.

2. Background Information

Wireless broadcast service providers, such as satellite service providers, can provide video on demand (VOD), near video on demand (NVOD), and non-VOD services, free channels, and channels requiring payment to home customers. When providing such services to a people transporter, such as an airplane, a bus, or a train, which may also provide locally stored content, problems arise because the people transporter is not stationary and may enter and leave the regulated coverage area of the wireless service provider. A regulated coverage area of a wireless service provider is an area where services from the wireless service provider are authorized to be received. When a people transporter is not in a regulated coverage area of a wireless provider, the people transporter should not provide services offered by that wireless provider even if the people transporter is within the reception footprint of that wireless service provider.

The problems, among others, of providing wireless services to a people transporter include when and how to provide program guides for channels offered by a wireless service provider and when to offer and allow purchase of channels from that wireless service provider. These problems are partly caused by the fact that a people transporter is not confined to the regulated coverage area and may go in and out of the regulated coverage area during its movement.

For example, for a home entertainment system, a customer may pay monthly service fees and does not need to make a purchase decision at a specific time in the viewing experience because the home entertainment system is confined in a building and thus is always inside the regulated coverage area of the wireless service provider. This purchasing scheme is, however, inadequate for a passenger in a people transporter because a people transporter may not always stay within the regulated coverage area and a passenger most probably will not stay in the same people transporter for a day, let alone a month.

The present invention described herein addresses these and/or other problems, and provides a method and apparatus for providing services including channels provided by a wireless service provider in a people transporter.

SUMMARY OF THE INVENTION

A system and method in accordance with various implementations of the present principles addresses the deficiencies of the prior art by providing offers and refunds for purchasing channels from a wireless service provider according to route information in a mobile content distribution system in an airplane, a train, or a bus. According to one aspect of the present principles, a method for use in providing video service in a mobile content distribution system capable of receiving wireless broadcast channels from a wireless service provider is disclosed. According to an exemplary embodiment, the method includes steps of receiving from a user purchase of wireless services including one or more broadcast channels provided by a wireless service provider; receiving information indicative of a route from an originating location to a destination location; and determining if the content distribution system is authorized to receive services from the wireless service provider according to said information; and if the content distribution system is not authorized to receive services from said wireless service provider according to said information, providing a refund to the user.

If the content distribution system is authorized to receive services from the wireless service provider according to said information, the method further includes steps of determining if the content distribution system is authorized to provide full service from the wireless service provider according to the information; and if the content distribution system is not authorized to provide full service, providing a partial refund to the user.

If the content distribution system is within an area authorized to receive services from the wireless service provider, the method further includes steps of determining if signals from the wireless service provider are present; and if the signals are present and the user has selected one of the purchased channels, enabling playback of signals from the selected channel.

If the selected channel is not one of the purchased channels, the method further includes a step of offering the user to purchase the selected channel.

According to another aspect of the invention, a mobile content distribution system is disclosed. According to an exemplary embodiment, the system includes a wireless service gateway for receiving broadcast signals from a wireless service provider; a system controller for controlling a plurality of receivers; a local network connecting said wireless service receiver, the system controller, and the receivers; and wherein one of the receivers receives from a user purchase of one or more broadcast channels provided by the wireless service provider, the system controller receives information indicative of a route from an originating location to a destination location, determines if the system is authorized to receive services from the wireless service provider according to the information, and provides a refund to the user if the system is not authorized to receive services from the wireless service provider according to the information.

If the system is authorized to receive services from the wireless service provider, the system controller determines if the system is authorized to provide full service from the wireless service provider according to the information and if the system is not authorized to provide full service, the system controller provides a partial refund to the user.

If the content distribution system is within an area authorized for the content distribution system to receive services from the wireless service provider, the system controller is operative to determine if signals from the wireless service provider are present and if the signals are present and the user has selected one of the purchased channels, the one of the receivers is enabled to play back of signals from the selected channel.

If the signals are present and said user has not purchased the selected channel, the one of the receivers presents an offer for the user to purchase the selected channel.

Even if the mobile content distribution system is not within an authorized area of a wireless service provider, the system can offer a user to purchase the wireless services from the wireless service provider.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

The present principles include a system and method for providing wireless broadcast services, such as entertainment programs, to customers, particularly paying customers, on a people transporter, such as an airplane, a train or a bus, as the people transporter enters and leaves a regulated coverage area. A regulated coverage area of a wireless service provider is an area where services from the wireless service provider are authorized to be received. For example, services from a wireless service provider, such as a satellite service provider, may be authorized to be received in the continental US (not including Hawaii) but not in Canada and Mexico. In this case, the continental US is the regulated coverage area, and Canada and Mexico are outside of the regulated coverage area of that wireless service provider.

Although illustratively, the continental US is used as an example as a regulated coverage area, a wireless service provider may have some portions in the continental US as the regulated coverage area and other portions in the continental US as outside of its regulated coverage area. A regulated coverage area may cover areas across two or more countries and/or may include areas that are disjointed.

Although the present principles are described herein below primarily within the context of an airplane content distribution system, the specific implementations of the present principles should not be treated as limiting the scope of the invention. It is appreciated by those skilled in the art and informed by the teachings of the present principles that the concepts of the present invention can be advantageously applied in other types of mobile content distribution systems. For example, the concepts of the present principles can be implemented in content distribution systems used in trains, buses, and other people transporters. These content distribution systems may be called mobile content distribution systems. As used herein, a mobile content distribution system is a content distribution system that may move in and out of the regulated coverage area of a particular wireless service provider.

Although in the exemplary embodiment, the mobile content distribution system provides services provided by a single wireless service provider, the principles of the invention can be applied to a mobile content distribution system that provide services provided by two or more wireless service providers, each of which is handled in a similar manner as in the exemplary embodiment.

Although the exemplary system is described as Internet Protocol (IP) based, the principles of the present invention can be applied to other IP or non-IP based systems. Although a purchasing unit is illustratively a channel provided by a satellite service provider or the entire satellite package, the purchasing unit can be a program listed in a program guide.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and implementations of the present principles, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it is appreciated by those skilled in the art that the block diagrams presented herein represent conceptual views of illustrative system components and/or circuitry embodying the principles of the invention. Similarly, it is appreciated that any flow charts, flow diagrams, state transition diagrams, pseudo code, and the like represent various processes which can be substantially represented in computer readable media and so executed by a computer or processor, whether or not such computer or processor is explicitly shown.

Figure 1:
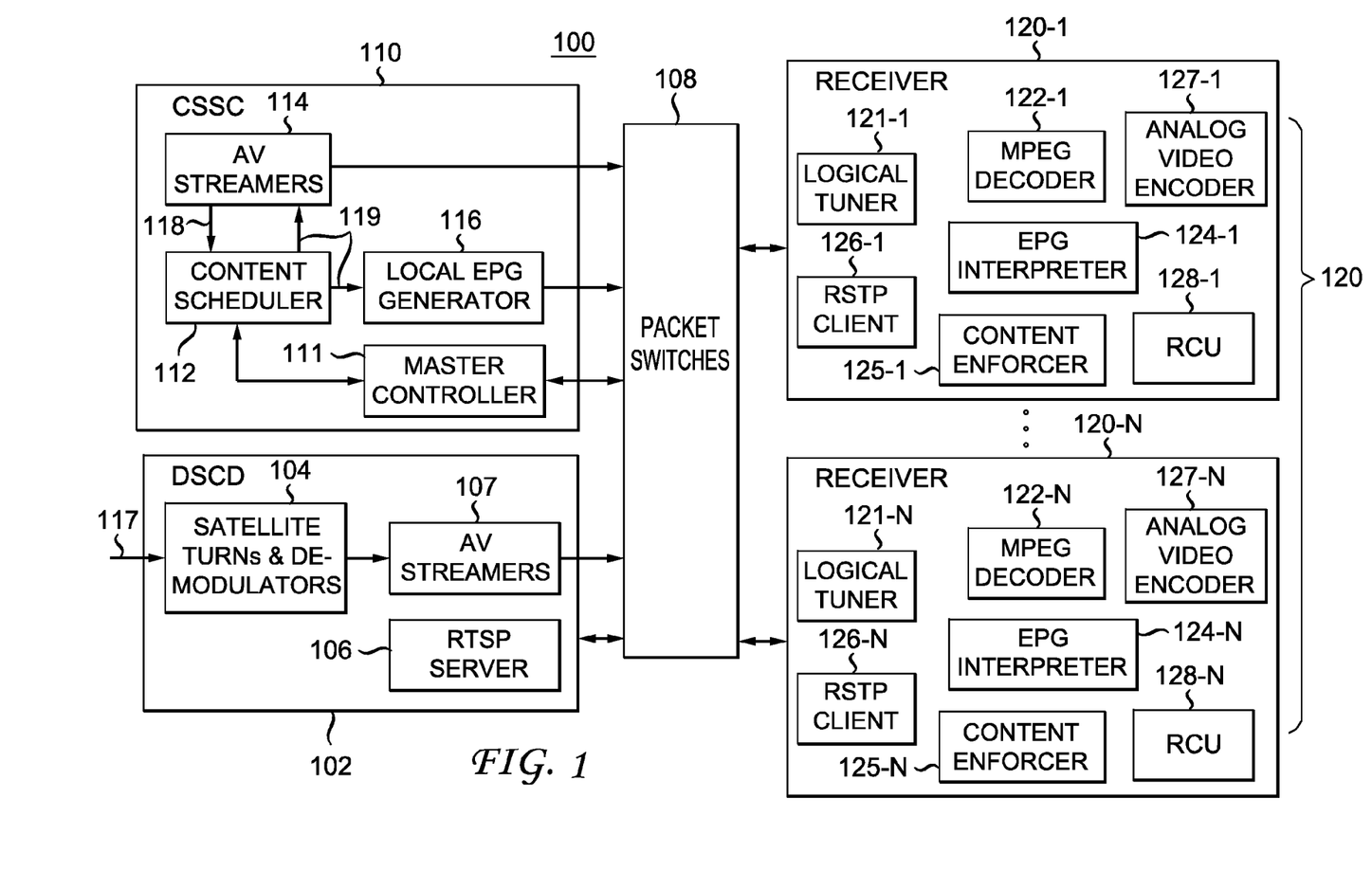
FIG. 1 is a block diagram of a system suitable for implementing the present invention.

Referring now in specific detail to the drawings in which like reference numerals identify similar or identical elements throughout the several views, and initially to FIG. 1, a high level block diagram of an exemplary mobile content distribution system 100 for providing local content and/or satellite content in accordance with one exemplary implementation of the present principles is illustrated. The system 100 may include a digital satellite concentrator and distributor (DSCD) 102, a content server and system controller (CSSC) 110, Ethernet switches 108 and a series of receivers (or seat box decoders) 120-1 to N. The receivers 120-1 to N may respectively include logical tuners 121-1 to N, MPEG decoders 122-1 to N, electronic program guide (EPG) interpreters 124-1 to N, content enforcer 125-1 to N, RTSP clients 126-1 to N, analog video encoders 127-1 to N, remote control unit (RCU) receivers 128-1 to N, video display units (VDUs) (not shown), and credit card readers (not shown). The receivers 120 respectively service VDUs and receive passengers' comments from respective RCUs.

Although a RCU is illustrated for entering user requests, a touch screen technology can be used as well.

A receiver 120 services a passenger in a seat. Each receiver 120 can be disposed on a separate board. In an alternative, two or more receivers 120 can be disposed on a single board. For example, if a row includes three seats on one side of the aisle, three receivers 120 can be located in one single board.

The DSCD 102 acts primarily as a wireless service gateway and in this exemplary embodiment as a satellite gateway for the mobile content distribution system, the CSSC 110 acts primarily as the primary system controller responsible for overall system operation and local content insertion, and the receivers 120, are operative primarily to respectively provide video displays and receive user inputs from respective passengers. The local content is stored in a storage (not shown) accessible by the CSSC 110. The CSSC 110 controls the DSCD 102 and the receivers 120 via the local network, which, in this example, includes packet switches 108. Although a packet switched network is illustrated, other switched networks, such as circuit switched networks, can be used as well.

Briefly, when the system 100 has been started, the DSCD 102 should try to lock to a transponder (satellite channel) of a satellite and each of the receivers 120 should try to acquire current satellite EPG by tuning to a specific satellite channel. As known in the art, a satellite channel may carry one or more television (TV) channels or programs. The receivers 120 will not be able to receive any EPG data until the DSCD 102 has locked to a channel indicating that the satellite signals are present. The CSSC 110 should include a memory (not shown) for storing, among others, data indicative of regulated coverage areas of one or more satellite service providers. In addition, the memory should also store data indicating whether satellite services from a particular service provider are allowed in each route, what channels are allowed to be provided in each route and data for each route indicating pricing for the whole package (all satellite channels from a satellite service provider), discounted price if some channels are not allowed, and whether a satellite channel can be displayed in an EPG. The CSSC 110 should receive information indicative of a route, such as originating and destination airports, before the aircraft has taken off, so that the CSSC 110 may inform the receivers 120 the pricing and allowable satellite services/channels. The CSSC 110 may also determine the current position of the aircraft by using, for example, a GPS, so that the CSSC 110 can determine whether the aircraft is in a regulated coverage area. When the aircraft enters the regulated coverage area, the CSSC 110 informs the receivers 120, which enable display of an OSD asking respective passengers whether they want to watch satellite TV. If a passenger indicates that the passenger wants to watch satellite TV, the corresponding receiver 120 should be operative to tune to the satellite channel carrying the satellite EPG. The received satellite EPG is then displayed on the corresponding VDU. The passenger may then try to tune to any of the satellite channels using the satellite EPG. If the passenger has already paid for the tuned channel, the receiver will display signals from that channel. If the passenger has not paid for it, the receiver should initiate a purchase sequence for the passenger to purchase the tuned channel.

DSCD 102 receives video content data streams and corresponding program guide information from a satellite service provider (not shown) along line 117 through satellite tuners and demodulators 104. The satellite audio/video (AV) and EPG streams are passed to the AV streamers 107 where channels are packaged in IP protocols and are streamed onto the local network including packet switches 108.

In this embodiment, although slow satellite EPG carousels are available on every transponder of the satellite, the fast load satellite EPG stream, which should be received prior to using the slow carousels, is only available on one specific transponder. The fast load satellite EPG stream has a predefined PID (Program Identifier) and a receiver 120 can receive the fast load satellite EPG stream by tuning to that specific transponder and selecting that PID.

Functions of the DSCD 102 may include modifying received EPG packets to indicate the presence of a local network so that a receiver 120 can acquire the guide for local content generated at the CSSC 110. A receiver 120 may simply acquire the guide for local content without waiting for the modified satellite EPG packets.

Additionally, the DSCD 102 may include a Real Time Streaming Protocol (RTSP) server 106 to service receivers 120 by receiving local and satellite content tuning requests and responding to the receivers 120 by sending corresponding multicast group addresses on which requested video streams can be found. Here, the RTSP server 106 can distinguish between tuning requests for local content and tuning requests for satellite content.

The DSCD 102 decides if a RTSP request is for local content or satellite content depending on the tuning information contained in the RTSP request. If it is for a satellite channel, then the DSCD 102 makes sure that the requested channel is present in an IP multicast on the local network. It then responds to the receiver 120 with the IP multicast address to which the receiver 120 should tune to receive the requested AV stream. If it is a request for local content, the DSCD 102 sends an RTSP response back to the Receiver 120 with the IP multicast address of the AV stream for that local channel. In either case, the receiver 120 then uses Internet Group Management Protocol (IGMP) to join the correct IP multicast stream.

Further, audio/video content and guide information received from the satellite can be sent by the DSCD 102 to receivers 120 on an Audio/video Digital Satellite Service (DSS) Transport Stream (TS), similar to MPEG transport stream, through switches 108.

The CSSC 110 is the primary system controller that is responsible for overall system operation and local content insertion. For example, local content may include video instructing passengers of customs regulations or video instructing passengers of safety precautions.

Further, it should be noted that local content can also comprise entertainment programs or motion pictures stored within CSSC 110. Components of the CSSC 110 can include, inter alia, AV streamers or data pumps 114, a content scheduler 112, a local electronic program guide (EPG) generator 116 and a master controller 111, each of which is discussed herein below.

An AV streamer 114 can be configured to generate and stream AV content onto the local network at a proper rate. For example, an AV streamer 114 can aggregate and encapsulate packets from a digital video file into a Real-time Protocol (RTP)/User Datagram Protocol (UDP)/Internet Protocol (IP) stream. The local channels are limited to a certain range. Each local channel in this embodiment includes only one TV program. A multicast address of a local channel can be derived from a local tuning request by for example a formula. Since a multicast address of a local channel can be derived from a local tuning request, the AV streamers 114 do not have to inform the RTSP server of the multicast addresses for local channels. As an alternative, the AV streamers 114 may inform the RTSP server 106 of the mappings between the multicast addresses and local channel numbers, so that the RTSP server 106 can provide a corresponding multicast address from a channel number included in a local tuning request.

The local content is stored in a storage medium (not shown) accessible by the AV streamers 114.

The content scheduler 112 may control, via line 119, insertion of local content and local EPG streams by employing a local guide Extensible Markup Language (XML) file. For example, the AV Streamers 114 can receive a signal along line 119 indicating that a local guide XML file has been changed. The local guide XML file may include a base time, channel listing, program listings and related information, optional pause functionality for channels, file names of files and schedules, which can be offset by a base time.

Another function of the content scheduler 112 includes coordinating actions with receivers 120 by sending control commands such as force tuning the decoders 122 within the receivers 120. Force tuning can be performed by the content scheduler 112, for example, to force the decoders 122 to tune to a channel transmitting locally inserted content and to force the decoders 122 to tune to a previously tuned channel when the locally inserted content has finished playing.

According the principles of the invention, the content scheduler 112 also creates and updates enforcing data, for example including an enforcer table, for each receiver 120 under the control of the master controller 111, so that the content enforcer 125 in each receiver 120 can decide whether a service, such as a channel, can be accessed, such as viewed, and/or displayed in an EPG. Enforcing data should at least include information regarding whether a channel can be displayed in an EPG and whether a channel has been purchased.

In some implementations of the present principles, an AV streamer 114 may act as the front end for content scheduler input. For example, an AV streamer 114 can be configured to monitor an XML file corresponding to a schedule of local programming, local content filenames and high-level commands such as "PAUSE."

In addition, an AV streamer 114 can parse XML files and supply guide generation related inputs to the local EPG generator 116, which is discussed in more detail below. In general, an AV streamer 114 can be controlled through the local guide XML file generated by the content scheduler 112.

Further, an AV streamer 114 can inform the content scheduler 112 via input line 118 of the content currently playing, when certain content has finished playing, and the state of an AV streamer 114 through a Now Playing (NP) XML file. The playing status of content can be useful for pausing or un-pausing content for the display of locally inserted content, as discussed below with respect to the content scheduler 112. The format of the NP XML file can include a base time, a timestamp and a channel listing, which can reference all channels. The channel listing can include a channel name, channel objects, which can include a user-recognizable number, name and logo, and program information.

The base time can indicate a time by which all program start times and end times or other events are measured. For example, a base time can be Jan. 6, 1980 12:00 a.m. Global Positioning System (GPS) time and all program start and end times can correspond to the total number of seconds after this time. In an alternative, the base time can be set to the beginning of a flight, so that the program start and end times do not change from day to day.

An AV streamer 114 can further include an XML parser (not shown) that can parse the local guide XML file created by the content scheduler 112 for control purposes. Alternatively, the XML parser can be independent of an AV streamer 114 and can parse the local guide XML file for both an AV streamer 114 and the local EPG generator 116. An AV streamer 114 can monitor the local guide XML files for any changes to the status of channels or programs.

The EPG generator 116 uses the schedule information from the local guide XML file to construct local EPG streams. In this implementation, fast load and slow carrousel streams are created and transmitted onto the local network at the proper rate. The fast load streams transmitted in a particular local channel allow the EPG information to be transmitted faster than slow carrousel streams.

The master controller 111 in the CSSC 110 is responsible for all high-level system operation and coordination. It keeps track of passenger credit card payments for each seat, controls DSCD 102 configuration settings, controls the content scheduler 112, and has a private communications channel to elements in the Receivers 120, such as the content enforcers 125. It also takes input from an operator's console (not shown).

Further, the master controller 111 can also institute a denial or grant of access to local or satellite channels for a receiver 120 through communications to the content enforcer 125 in a receiver 120. It should be noted that in one or more implementations of the present principles, the master controller 111 can employ a separate communications channel to control content enforcer 125, which interacts with the EPG interpreter 124 of a receiver 120 so that only channels in the EPG that a passenger is authorized to view are displayed in the EPG.

In addition, the separate communications channel can be utilized by the master controller 111 to control which channels a particular receiver can tune to for the display of video content. For example, a receiver 120 can tune to only those channels that the customer has paid for. The master controller 111 keeps track of financial transactions for each receiver such as credit card swipes. Further, the master controller 111 can coordinate receivers 120 and control which channels are displayed in a program guide at a receiver by employing, for example, unique channel object identifiers to reference channels. Thus, according the principles of the invention, even though a receiver 120 may receive channel information for all local and satellite channels, the receiver 120 may not display a program guide including all the channels.

The receivers 120 can, for example, respectively service video displays and receive RCU inputs for each passenger seat. In this example, there is one receiver for each passenger seat on the airplane.

The structure of a receiver may be based on software and hardware used in a standard satellite set-top box (STB), such as ones used in DirecTV®. In this exemplary system, a receiver 120 does not have a RF tuner and demodulator because these two components are included in the DSCD 102. One embodiment of a receiver is to limit one receiver to have only one logical tuner, so that hardware resources (e.g., PID filters, etc.) and the software are more limited. In this embodiment, a receiver 120 may receive and parse packets from only one channel at any given time. As such, the update or collection of all EPG information may be slower. Although slow satellite EPG carousels are available on every transponder of a satellite, the fast load satellite EPG stream, which should be received prior to using the slow carousels, is only available on one specific transponder. In the exemplary embodiment, the DSCD 102 does not have the ability to replicate this fast load EPG signal and include it in every channel or IP multicast stream.

Another embodiment is that each receiver 120 includes two logical tuners, allowing one to be constantly monitoring the fast load satellite EPG stream while the other logical tuner continues to be used for current channel viewing. In the following, the embodiment where each receiver 120 includes only one logical tuner will be further illustrated.

Satellite tuning information includes information such as satellite, transponder frequency, and signal polarity for satellite services. The tuning information is derived by the corresponding content enforcer 125 according to channel information in the unified EPG created by the EPG interpreter 124 upon receiving a channel selection from a passenger from the corresponding RCU and the selection signal is received by the corresponding RCU receiver 128. Once a tuning request is approved by the corresponding content enforcer 125, this information is turned into a RTSP tuning request by the corresponding RTSP Client 126.

In response to a RTSP tuning request, the RTSP server 106 in the DSCD 102 should send a multicast address representing the requested channel to the requesting receiver 120. Upon receiving an IP multicast address from the DSCD 102, the logical tuner 121 in the requesting receiver 120 tunes to the satellite channel by using the Internet Group Management Protocol (IGMP) to join the multicast and uses a PID to receive the selected TV channel from the multicast.

The MPEG decoder 122 receives multicast audio/video streams from the network via a network interface and the corresponding logical tuner 121. Local AV streams are transmitted from the CSSC 110 and satellite AV streams are forwarded onto the local network by the DSCD 102. The MPEG decoder 122 can parse an AV stream, decode the video, decode audio, and present the decoded video and audio to the analog video encoder 127 for transmission to the corresponding VDU and headset (not shown).

An MPEG decoder 122 may be packaged as but not limited to a system on chip (SOC), in which a combination of microprocessor and peripherals are built onto one integrated circuit (IC).

The EPG Interpreter 124 receives multicast EPG streams from the network via a network interface and the corresponding logical tuner 121. Local program guide streams are transmitted from the CSSC 110 and satellite guide streams are forwarded onto the local network by the DSCD 102. The EPG interpreter 124 decodes each guide stream, combines the information from both local and satellite guides, and creates one unified EPG to be presented to the passenger on the corresponding VDU. Only channels allowed to be displayed by the enforcing data, such as data in an enforcer table, in the corresponding content enforcer 125 can be displayed in the EPG.

The content enforcer 125 works with the corresponding EPG Interpreter 124 to display only valid channels for the offered entertainment service. It is possible that not all available satellite channels are in the channel lineup. The content enforcer 125 also works with the RTSP Client 126 to make sure that only channels that the customer is allowed to see (e.g., has been paid for) can be tuned.

The content enforcer 125 includes enforcing data, including, for example, a structure, called the enforcer table (not shown), as an example, which is used to control these actions. The enforcer table is created and sent to the content enforcer 125 by the content scheduler 112 in the CSSC 110.

A content enforcer 125 can be operative to receive user inputs from the corresponding RCU.

An enforcer table in this example is a structure that provides information, for each channel, required to determine whether or not a local or a satellite channel should be shown in a displayed EPG and whether the user is allowed to watch programs on that channel. Note that even if a channel is displayed in the EPG, the channel may not be watched by a particular passenger, for example, if the passenger has not paid for it.

All access to the content enforcer 125 is based on but not limited to a unique 32-bit channel identifier associated with each local and satellite channel in the exemplary embodiment. This identifier is a channel object identification (ID) from an EPG data stream. A channel object includes information regarding a channel. For each channel, the information shown in Table 1 is stored in the enforcer table, which is stored in a memory (not shown) in the corresponding receiver.

Note that if a purchase unit includes a program, the enforcer table should be created for each program. A program can be linked to a channel according to the program information in the EPG.

In addition to the enforcer tables, the enforcing data may simply indicate that no satellite channels will be displayed in an EPG and offered for purchase.

A customer/passenger can request to watch a specific channel (local or satellite) by choosing that channel on the EPG using the corresponding RCU. If the requested channel has not been purchased according to the enforcer table, the content enforcer 125 in the receiver 120 presents the passenger with on-screen displays (OSDs) that allow the passenger to pay by credit card. Payment information is sent back to the master controller 111 in the CSSC 110 via a separate control channel over the local network. The master controller 111 instructs the content scheduler 112 in the CSSC 110 to update the corresponding enforcer table in the receiver 120, allowing that channel to be tuned. Once the customer is allowed to watch a channel, the tuning request for that channel is transformed into a RTSP request by the RTSP client 126 and is sent over the local network to the RTSP server 106 in the DSCD 102.

TABLE 1

| | |
|---|---|
| Channel Object ID | The object ID associated with this table entry. |
| Show in Guide? | Boolean flag that indicates whether the channel should be permitted in guide displays (TRUE = show). If the user is channel surfing, channels that are not included in the guide will be skipped. |
| Block Unrated Content? | Boolean flag that indicates that unrated programs shown on this channel may be inappropriate. If the system rating limits are set to query the "block_unrated_content" flag, and the "block_unrated_content" flag is set, then unrated programs will be blocked. (TRUE = block_unrated_content). |
| Paid State | Payment state for this channel. Possibilities include: Free to view Free preview period but payment required. Payment required, video disallowed. Payment no longer allowed, video disallowed. Has been purchased. |
| Cost in Cents | Cost to purchase this channel (in cents) |
| Offer Status | Included/Excluded. If a channel cannot be provided under contract, the channel is excluded. If the aircraft is outside of the regulated areas, the channel is excluded. The master controller 111 may exclude a channel for other reasons. |
| Category List | A list of categories associated with this channel. These may be used to further filter the grid guide display. |

The RTSP server 106 in the DSCD 102 decides if the RTSP request is for local content or satellite content depending on the tuning information contained in the RTSP request. If it is for a satellite channel, then the DSCD 102 makes sure that the requested channel is present in an IP multicast on the local network. It then responds to the receiver 120 with the IP multicast address to which the receiver 120 should tune to receive the requested AV stream. If it is a request for locally stored content, the DSCD 102 sends an RTSP response back to the receiver 120 with the IP multicast address of the AV stream for that local channel. In either case, the receiver 120 then uses IGMP to join the IP multicast stream.

If no multicast exists for a satellite tuning request, the RTSP server 106 requests one of the unused satellite turners and demodulators 104 to tune to a transponder requested by the tuning request and requests one of the unused AV streamers 107 to package the received signals from that transponder in IP protocols and stream the signals onto the local network. A multicast address of a satellite channel can be derived from a tuning request by for example a formula. As an alternative, the AV streamers 107 may inform the RTSP server 106 of the mappings between the multicast addresses and satellite channel numbers, so that the RTSP server 106 can provide a corresponding multicast address from a channel number included in a tuning request.

A receiver 120 includes the ability to cache satellite EPG objects. In one embodiment, during a receiver boot-up, the receiver checks for the availability of satellite EPG streams. If those are not available, the receiver may use the most up-to-date EPG objects in the cache during receiver boot-up to construct a satellite EPG. This operation is designed for situations where the satellite signals may not be present when the system is started. This can happen when for example the airplane is on the ground in Hawaii, when the regulated coverage area is limited to continental US, or there is dense cloud cover, as during an e.g., storm.

There are many types of EPG objects within an EPG stream. These objects may include information regarding to program information, schedule, transponder frequencies, signal polarities, and others, so that information can be provided to a satellite tuner and demodulator 104 to locate a particular stream within the many coming down from the satellite.

In most cases, both satellite and local content should be available simultaneously. However, in some situations, satellite programming of a wireless service provider may not be available, for example, when the airplane is outside of the regulated coverage area of that wireless service provider. Occasionally, the signal tracking of the satellite receiving antenna on the airplane cannot keep up with the aircraft movement even though the airplane is within the regulated coverage area of that wireless service provider. When the satellite signals are lost, the IP multicast streams from the satellite are no longer available on the local network. An MPEG decoder 122 signals this event of loss of satellite signals to other processes, such as the content enforcer in the receiver 120, so that an OSD explaining the temporary loss of service is displayed, if the passenger is watching a satellite channel. This pop-up OSD is due to normal aircraft movement (DTNAM). If the passenger is watching a local channel, the service would not be interrupted and the DTNAM OSD may not be required to be displayed.

A satellite tuner and demodulator 104 can also detect the loss of the satellite signals if it cannot lock to a transponder and can inform the CSSC 110 and each receiver 120 of the event through the local network.

In one embodiment, the satellite services from a satellite service provider can be displayed in the unified EPG, even though the airplane is outside of the regulated coverage area of that satellite service provider, if the airplane is flying via international waters toward an airport, which is within the regulated coverage area of that satellite service provider. For example, a flight originating outside of the continental US e.g., Hawaii, flying to Newark, N.J. within the continental US, the satellite signals are not present, i.e., signal strength not sufficient for the receiver to reproduce the signals, during system startup. In this case, the satellite EPG streams are not available and the only EPG streams being received by the receiver 120 are the EPG streams associated with locally stored content. As such, the EPG interpreter 124 of a receiver 120 builds its unified EPG database by using the local EPG streams and the cached satellite EPG objects stored in the receiver 120. A cached satellite EPG, is the last satellite EPG received by a receiver 120 when the satellite services are still available. After system startup, if a passenger tries to tune to a satellite channel when the airplane is still outside of the satellite reception area, then the passenger should get an OSD stating that satellite service is not available. If the passenger tries to tune to a satellite channel after the airplane is within the satellite reception footprint, then they should be able to get the correct channel. The cached guide continues to be used in this embodiment since to regenerate a fresh guide in the case that the receiver 120 includes only one logical tuner, the receiver 120 is required to go through a full or partial reboot to rebuild the unified EPG from the fast load satellite EPG stream for about 30 seconds and the passenger's service would be interrupted in that period.

In this embodiment, a receiver 120 may offer an OSD through its content enforcer 125 asking whether the passenger wants to reboot the receiver 120 in order to receive the up-to-date satellite EPG and warning the passenger that the current service will be interrupted if the passenger agrees to reboot the receiver 120. The OSD should provide buttons for the passenger to enter a response.

In this embodiment, the receiver 120 may also offer the passenger through an OSD to acquire up-to-date satellite EPG without fully rebooting itself although the service still may be interrupted. If the passenger agrees, the logical tuner 121 may temporarily tune to the satellite channel (transponder) that provides the fast load satellite EPG stream and then tune back to the previous channel, which may be a local or satellite channel.

In another embodiment, satellite services from a satellite service provider can be displayed in the unified EPG when the airplane is within the regulated coverage area and the satellite services can still be displayed until the satellite signals cannot be received even if the airplane is outside of the regulated coverage area of that satellite service provider. This embodiment is applicable for a flight meeting the following criteria: originating within the regulated coverage area to a city outside of the regulated coverage area of the satellite service provider, the route being above international waters after leaving the regulated coverage area and before reaching the destination, and the signals being known to disappear in the international waters before reaching the destination. It is preferable, that a warning OSD indicating that the satellite services will be available only for a limited amount of time at the beginning of the flight, when a passenger starts viewing a channel or program, or when a passenger is purchasing a program or channel.

For example, on a flight originating within the continental US, which in this example is the regulated coverage area of a satellite service provider, flying to e.g., Hawaii, the mobile content distribution system 100 may display the satellite services from that satellite service provider in the unified EPG and provide the satellite service until the signals can no longer be received. When the satellite signals are lost, the IP multicast streams originating from the satellite are no longer available on the local network and a receiver 120 will display a DTNAM OSD if the passenger served by that receiver is watching a satellite channel. When the satellite signals are no longer present, the unified EPG should not include any service from that satellite service provider.

Under certain situations, even though the airplane has crossed the regulated coverage area, the satellite signals may be still present and the services from that wireless service provider are allowed to continue until the airplane has landed. In these situation, the master controller 111 must receive a signal (not shown) indicating that the plane has landed, so that the master controller 111 can inform the content enforcers 125 to stop providing signals from satellite channels to passengers and instruct the content scheduler 112 to update the enforcing data including enforcer tables to stop the satellite services and the display of the satellite services in the unified EPG.

In another embodiment, if a flight stays within the continental USA, the illustrate regulated coverage area for a satellite service provider, for only a short time (e.g. LA to Hawaii), the airplane multimedia distribution system 100 may be programmed not to offer satellite services from that satellite service provider.

In another embodiment, satellite services from a satellite service provider can be displayed in the unified EPG only when the airplane is within the regulated coverage area. When the airplane is outside of the regulated coverage area of that satellite service provider the satellite services from that satellite service provider are not displayed in an EPG and cannot be offered for purchase. The master controller 111 determines if the aircraft is in or out of the regulated coverage area by determining if the GPS provided coordinates (position) are inside or outside the regulated coverage area stored in the memory.

When the flight leaves the regulated coverage area, i.e., the boundary of the continental US in this example, as determined by GPS coordinates, the master controller 111 in the CSSC 110 should instruct the content enforcer 125 of a receiver 120 through a private control channel across the local network to stop providing satellite services and to put up an OSD indicating that satellite channels are no longer available. The master controller 111 also updates the enforcer tables in the receivers 120 over the private control channel across the local network, so that the content enforcer 125 does not allow satellite channels to be shown in the EPG display. Only locally stored content is available through the remainder of the flight.

It should be noted that even though an aircraft is within the regulated coverage area of a satellite service provider, the services from that satellite service provider may be unavailable for brief periods due to weather, rapid aircraft movement, etc. In this situation, a receiver 120 should provide a DTNAM OSD indicating that the signals are temporarily lost, if the passenger is watching a satellite channel or program. In addition, even if no passenger is utilizing any satellite service from that satellite service provider, at least one of the satellite tuners and modulators 104 should be always trying to lock the signals, so that the master controller 111 and each receiver 120 may be informed, when the signals become present again.

This embodiment is applicable for flights originating or connecting through cities that are outside the USA, such as Toronto, Canada, or originating from outside of the USA. When the aircraft is originated from outside of the USA, a receiver 120 may be able to receive satellite channels, but the receiver 120 should be restricted from providing US satellite channels to passengers. Note that in the example, the regulated coverage area is the continental US.

In the case where the aircraft will be leaving the continental US and the airline is decided to offer satellite services from the satellite service provider, the passenger is informed via an OSD indicating that satellite services will only be available for a limited amount of time.

In this embodiment it is desirable to acquire a fresh satellite EPG when entering the continental US. If the receiver 120 only has one logical tuner 121, there is no way to acquire the fresh EPG without commandeering the logical tuner to tune to the fast load satellite EPG stream. If the logical tuner 121 is already in use by the passenger to watch a local channel, the service is interrupted because the receiver should be fully or partially rebooted, as described previously.

When satellite signal becomes present based on signal lock and the airplane is within the service boundaries based on GPS data, the passenger should be presented a pop-up OSD that informs the passenger that satellite service is now available. The master controller 111 informs all receivers 120 on the plane of the event, so that each receiver can display that OSD. The passenger is offered an opportunity to hit a guide button to see what satellite channels are available, or return to a local channel. If the passenger hits the guide button on the corresponding RCU, then the EPG Interpreter 124 will reset causing it to acquire the fast load satellite EPG stream. This should take approximately 30 seconds, so an OSD asking the passenger to please wait should be displayed. The enforcer tables are updated by the content scheduler 112, allowing all valid satellite channels to show up in the passenger's EPG. A receiver may then display a category screen showing different channel categories and user options, and with the last tuned channel (which would be a locally stored channel) in the corner of the EPG display. The category screen may show a list of following channel categories and user options: all, sports, news and information, entertainment and music, family and kids, and audio and language options. The audio and language options allow a passenger to set options, such as audio language, the menu language, and the caption feature. When "all" category is selected, all satellite channels can be displayed in an EPG. Otherwise, if one of the other categories is selected, only satellite channels that are associated with the selected category can be displayed in the EPG.

At this point, the EPG should be able to show any local and satellite channel information under the direction of a passenger. The passenger can now try tuning to any channel. If the channel requires further payment, then the passenger is allowed to buy access to the channel in the way previously described.

If the passenger desires to continue to watch the local channel they were previously watching, the passenger can either hit a return button on the pop-up OSD or they let that OSD time out.

The acquiring of current EPG mentioned above is considered a success if a receiver 120 can acquire satellite signal and load the satellite program guide within a predefined timeout. Once the fast load satellite EPG stream is fully acquired, the category screen should be displayed and the master controller 111 should be notified. If a receiver 120 cannot acquire satellite signal and load the satellite program guide within a predefined timeout, then the reset is considered a failure and the master controller 111 should also be notified.

In this embodiment, it is desirable that an OSD is displayed by the content enforcer 125 in a receiver 120 when entering the coverage area indicating availability of satellite services, and an offer to purchase satellite channels may be presented to the passenger at this point, but not prior to this point. It is also desirable that an OSD should be displayed when the airplane is about to leave the coverage area indicating the unavailability of satellite services/channels. The OSD should explain that the loss of satellite programming is due to the aircraft's location being outside of the regulated coverage area of the satellite service provider. The receivers 120 that are reproducing satellite signals should be stopped even if the satellite signals are still present.

The master controller 111 detects whether the aircraft is leaving or entering a regulated coverage area and informs the respective content enforcers 125 in the receivers 120 of the event via the local network, so that the receivers 120 may display a correct warning OSD. The master controller 111 also instructs the content scheduler 112 to update the enforcer tables in the receivers 120.

In general, a generic "fine print" should be shown on the purchase screen indicating that satellite services are only available within the regulated coverage area, such as the continental USA, of a satellite service provider.

In this embodiment, channels and programs displayed in the unified guide must be from the EPG stream in the live satellite broadcast. No cached satellite EPG information should be presented to passengers. It is desirable that all necessary guide information should have been received before showing channels in the guide.

As discussed previously, moving out/In the regulated coverage area may be detected via a global position system (GPS) in an airplane. Other positioning systems can be used as well. The master controller 111 receives the current position from a GPS, (not shown), so that it can determine whether a particular satellite service is authorized to be received at the location.

The master controller 111 is further operative to receive route information preferably before the plane has taken off, so that a passenger, through a receiver 120 assigned to his/her seat, may be able to pre-purchase local and satellite services either as a package or on a channel by channel basis, depending on whether the aircraft is in or out of the regulated coverage area when the route information has been entered. If the aircraft is not in the regulated coverage area, the mobile content distribution system 100 can offer satellite services as a package, and not on a channel-by-channel basis. However, if the aircraft is in the regulated coverage area, the system is allowed to offer both.

The route information may be represented by source-destination city pair because the route is predefined for each city pair. In an alternative, the route information may be entered manually through a user interface (not shown) provided by the master controller 111. For example, the master controller 111 can provide an on-screen menu for an airplane operator to enter one or more segments, each segment is represented by a start position and an end position. When the mobile content distribution system is located in a car, the route planned by a GPS can be input to the master controller 111 as the route information.

The city pair information can be used to determine if the flight will be leaving the continental US, entering the continental US, or staying with the boundary of the continental US.

To handle brief boundary crossings (e.g. hugging Canadian border), the master controller 111 should determine that the airplane is out of the boundary only if the GPS detected position is farther from the nearest point on the boundary of the regulated coverage area by a threshold to account at least for the error allowance of the GPS. The threshold may be decided according results from experiments.

Under certain situations, for example, contractual agreements with a particular wireless provider, the mobile content distribution system 100 may be programmed not to offer satellite services from that particular satellite service provider for certain flights. The information of the non-offering of the satellite services on these flights should be stored in the memory of the master controller 111.

For better understanding the drawings, it is helpful to know the following acronyms and terms:

city-pair: The originating and destination cities of an airline flight. This information is transferred from an aircraft to the mobile content distribution system 100, for example, after the aircraft door has closed. Among other things, it is used to decide what local content stored locally and/or satellite content can be offered on the plane.

pre-sell: Allowing purchase ahead of time of the rights to view satellite TV and/or locally stored content on a given flight. Usually the purchase is made on the flight. Each receiver 120 includes a credit card reader (not shown in FIG. 1).

Fast Load Satellite EPG Stream: An EPG stream sent in a particular channel to quickly fill in the bare essentials of the visible EPG displayed on the TV (e.g., channel numbers). Some of the other information is filled in more slowly over time with slow carousel streams in each channel.

Partial Satellite Service: Yes/No. If, in a flight, the system 100 cannot provide the entire satellite services from a wireless service provider, the system 100 may be considered offering only partial satellite service. The master controller 111 can determine whether full or partially satellite service will be offered after the city-pair has been entered.

LSP: It stands for "Locally Stored Program" representing the locally stored content streaming feature on the mobile content distribution system.

DTNAM: It stands for "Due to Normal Aircraft Movement" as described above. It is an acronym for a pop-up OSD indicating to a passenger that the satellite service is temporarily unavailable. The reason for the outage is most likely due to aircraft movement, but not necessarily.

According to the principles of the present invention, payment and offering of entertainment services are modified with in/out of service based on a geographic boundary, city-pair information, and signal strength.

Figure 2:
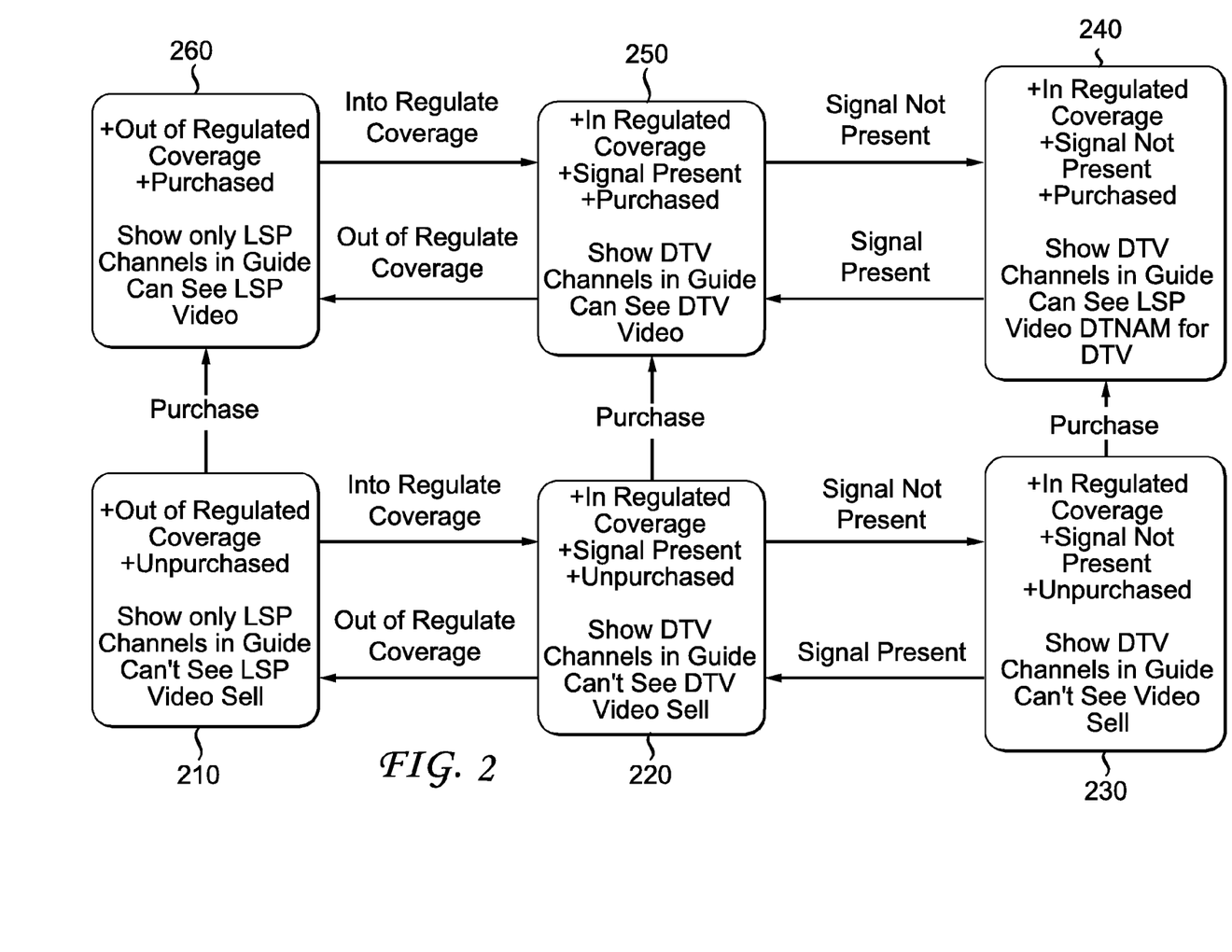
FIG. 2 is a state transition diagram of a receiver in the system depicted in FIG. 1.

Referring now to FIG. 2, it illustrates a state transition diagram 200 during a flight relating to a receiver 120 for the embodiment that satellite services from a satellite service provider can only be displayed in an EPG when the aircraft is in the regulated coverage area of the satellite service provider and are not allowed to be displayed in an EPG if the aircraft is outside of the regulated coverage area.

The state transition diagram will be explained with reference to the system 100 of FIG. 1. The terms "DTV channels" and "LSP channels" in FIG. 2 represents satellite channels and local channels, respectively. The state transition diagram includes six states. The top three states 240, 250, and 260 occur after a satellite service has been purchased. Once the service has been purchased, it remains purchased throughout the remainder of the flight and the receiver 120 may transition among states 240, 250, and 260 depending on whether the aircraft is moving in or out of the regulated coverage area and whether the satellite signals are present. The bottom 3 states 210, 220, and 230 occur before satellite service has been purchased. At the beginning of a flight, the service for each receiver 120 will originate in one of the bottom three states. If a passenger does not make any satellite purchase, the receiver 120 associated the passenger may transition among bottom three states 210, 220, and 230 during the flight depending on whether the aircraft is moving in or out of the regulated coverage area and whether the satellite signals are present.

For flights originating outside of the regulated area (e.g., Canada in this example), the service starts in state 210. The master controller 111 detects from the route information, which may be represented or derived from a city-pair, and the current position from the GPS that the aircraft is outside of the regulated coverage area before the aircraft has taken off. The master controller 111 informs the receivers 120 that the aircraft is outside of the regulated coverage area and instructs the content scheduler 112 to create/update enforcer tables and transmit the created/updated enforcer tables to respective content enforcers 125 in respective receivers 120, so that satellite services from the satellite service provider are not allowed by the respective content enforcers 125 for display in the respective EPGs. Since it is outside of the regulated area, it does not matter if satellite signals are present or not. A passenger will not be shown the satellite channels in the EPG in either case. Only the local services are shown in a displayed EPG.

A content enforcer 125, however, may offer sell of the satellite services as a package via an OSD, but not on a channel by channel basis because the satellite EPG is not yet available. If a passenger makes a purchase of a satellite service, the content enforcer informs the master controller 111, which instructs the content scheduler 112 to update the corresponding enforcer table of the content enforcer indicating that the passenger has purchased the satellite service as a package. The corresponding receiver 120 then transitions to state 260, but the passenger still cannot enjoy the purchased satellite service at state 260 because the aircraft is still outside the regulated coverage area.

As the flight progresses, the aircraft may move into the regulated coverage area. At that point, the master controller 111 determines from the current position from the GPS that the aircraft has moved into the regulated coverage area, informs the content enforcers 125 and instructs the content scheduler 112 to update the enforcer table, allowing a receiver 120 to display a unified EPG including local and satellite services and allowing the passenger to enjoy the purchased satellite service if the satellite signals are present as shown in state 250. The MPEG decoder 122 of a receiver 120 can detect that the satellite signals are present if it can receive the multicast stream in the tuned channel.

As the flight continues to progress, the MPEG decoder 122 may detect that the satellite signal is lost because the multicast stream is no longer available and detect that the satellite signals are regained when the multicast stream becomes available again. This temporary loss of the satellite signals may be caused by, for example, aircraft movement, cloud cover, etc. In this case, the receiver 120 moves between states 250 and 240. While satellite signals are not present, if the passenger was watching a satellite channel, the passenger should see the DTNAM pop-up OSD as directed by the content enforcer 125 until the signals return. If the passenger was watching a local channel, there is no change noticed when the satellite signal is lost and will continue to be able to watch the local channel without any interruption. If however the passenger tries to tune a satellite channel while the MPEG decoder 122 determines that the satellite signals are not present, the passenger should get the DTNAM OSD. It should be noted that local service is assumed to be available for a passenger to view in all six states including state 250, even though FIG. 2 does not explicitly state that the local services (LSP channels) are available.

For flights originating inside the regulated coverage area as detected by the master controller 111 with satellite signals being present as determined by the MPEG decoder 122, the receiver 120 starts in state 220. In this state, once the passenger purchases a satellite service either as a package or on a channel by channel basis, the receiver 120 transitions to state 250 in which both LSP channels and satellite channels are shown in the EPG and may be viewed. As discussed previously, as the satellite signals come and go, the receiver 120 moves between states 240 and 250 as long as the flight stays within the regulated coverage area.

If however, the flight is headed for an area outside of the regulated coverage area (e.g., Canada), the master controller 111 detects this situation, informs the content enforcer 125, and instructs the content scheduler 112 to update the enforcer table, so that satellite service are made unavailable, as shown in state 260. The local services such as LSP channels remain available.

If a flight originates inside the regulated coverage area as detected by the master controller 111 but the satellite signals are not present as detected by an MPEG decoder 122, the receiver 120 is in state 230. The content enforcer 125 continues to allow the receiver 120 to display satellite services such as satellite channels in the EPG. However, the satellite services in the EPG may not be current (stale) if the wireless service provider realigns the channels during the time when the satellite signals are not present.

When the passenger makes a purchase for a satellite package or a satellite channel/program in the EPG during the period that the satellite signals are not present, the receiver 120 moves to state 240 and the enforcer table is updated but the passenger still cannot view the purchased satellite services because the MPEG decoder 122 will still detect that the satellite signals are not present. As stated previously, when a purchase state has been changed, the corresponding enforcer table is updated by the content scheduler 112 to reflect the change.

Figure 3:
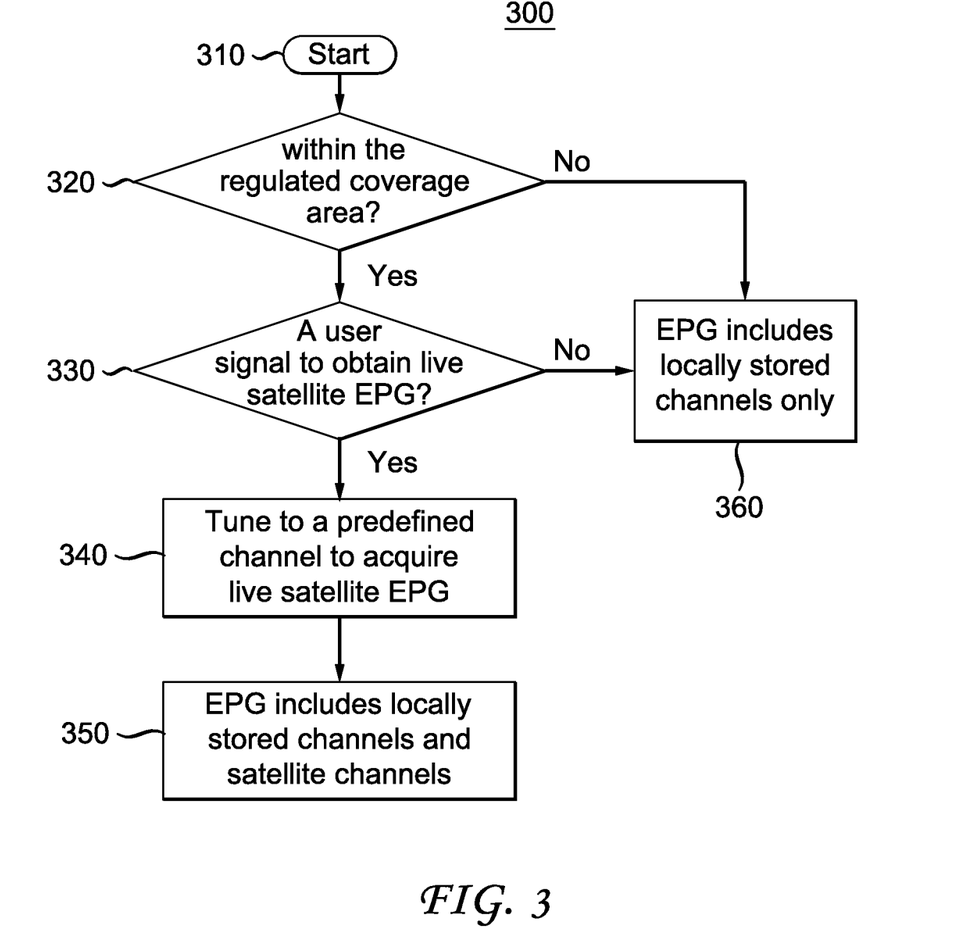
FIG. 3 is a flowchart illustrating steps for displaying an EPG according to an exemplary embodiment of the present invention.

Referring now to FIG. 3, it illustrates an exemplary flowchart 300 showing when wireless services, such as satellite services can be included in a displayed EPG. Although only one satellite service provider is illustrated, the principles of the invention can be extended to two or more satellite service providers. Each one of the service providers is handled in a similar manner. If the aircraft is outside of the regulated coverage area of any wireless service provider, the EPG will include only local channels. If the aircraft is in the regulated coverage area of two or more wireless service providers, the EPG should include the local channels and channels offered by the two or more wireless service providers.

The process starts at step 310, and at step 320, the master controller 111 determines whether the aircraft is within the regulated coverage area of a particular wireless service provider. If the aircraft is outside the regulated coverage area, the controller 111 may inform the receivers 120 and instructs the content scheduler 112 to update enforcer tables and other enforcing data, so that the content enforcers 125 do not display satellite channels in an EPG, as in step 360.

If the aircraft is within the regulated coverage area, the master controller 111 informs the receivers 120 and instructs the content scheduler 112 to update enforcer tables and other enforcing data, so that content enforcers 125 allow display of satellite channels in an EPG, and the process proceeds to step 330, in which a receiver determines whether the receiver has received a user signal from a user indicating whether live satellite program guide information should be acquired. The user signal is received either in response to an inquiry from the receiver or when the user activates a user interface to view the EPG, by for example, pressing the guide button in a RCU, or the user has selected a satellite channel for viewing.

The inquiry may be displayed in the form of an OSD asking the user whether the user desires the live satellite program information. The user may then activate a user interface, such as a button, in that OSD to provide the user signal.

If the receiver has received the user signal indicating that the user wants live satellite program guide information, the process proceeds to step 340, in which the receiver tunes to a predefined satellite channel to acquire the fast load satellite EPG. Prior to step 340, the receiver may provide the user a warning, for example, by displaying an OSD, indicating that the current service, such as video signals from a local channel, will be interrupted for some time, for example about 30 seconds. In one embodiment, when a receiver is rebooted, the receiver automatically tunes to the predefined satellite channel for acquiring the fast load satellite EPG and the step 340 can be achieved by rebooting the receiver.

After the fast load satellite EPG data has been acquired at step 340, the receiver may tune back to the last tuned channel before the tuning to the predefined satellite channel.

At step 350, the receiver enables display of an EPG including channels from both locally stored content and the satellite service provider.

If at step 330, the receiver determines that the receiver has not received the user signal indicating that the user wants the live satellite program information, the process proceeds to step 360, in which the receiver enables display of an EPG including local channels and without channels from the satellite service provider. It should be noted that the receiver should determine that the receiver does not receive the use signal, if a user provides a response that is not affirmative by, for example, activating a different button provided in an OSD menu or simply not responding in a predetermined time. One reason that a user does not want to receive the live satellite program information may be that the user does not want his current viewing to be interrupted.

In another embodiment, although the receiver did not receive the user signal indicating the desire of acquiring live satellite program information, the receiver may be designed to enable display of an EPG including channels from the satellite service provider based on a cached copy of the satellite program information stored in a memory. The receiver should indicate to the user that the displayed wireless EPG information is not current. The cached copy of the satellite program information is the copy that the receiver stored when the aircraft was last in the regulated coverage area. The EPG data can then be updated by using the slow satellite EPG stream in the tuned channel.

It should be noted that step 320 can be considered being performed by a receiver when the receiver receives the information from the master controller 111.

Before displaying an EPG, a content enforcer 125 should check an indicator, for example, its enforcer tables and other enforcing data, to determine whether some channels are not allowed to be displayed in an EPG. If there are channels not allowed to be displayed, a content enforcer 125 should not include those channels in the EPG.

Figure 4:
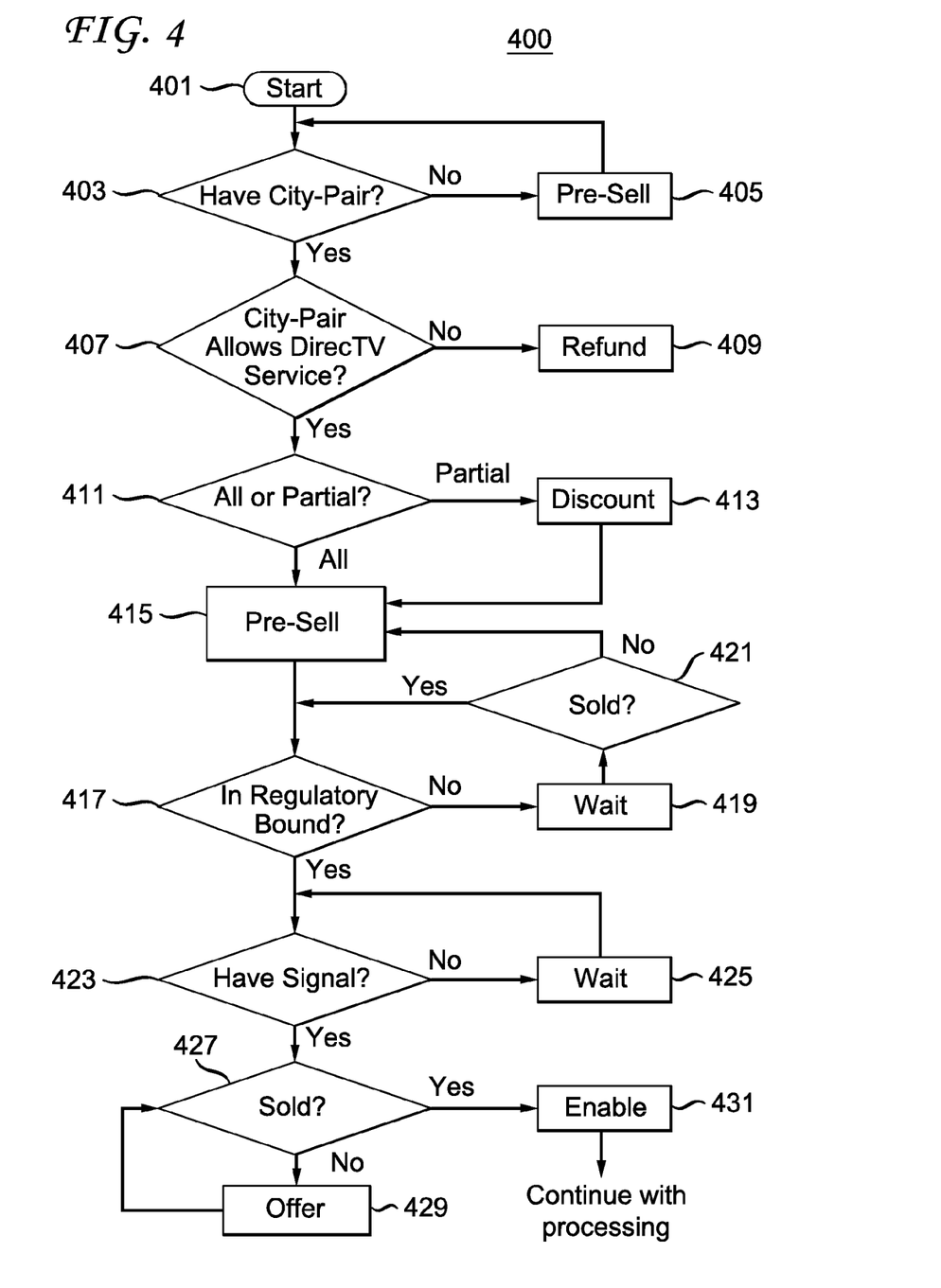
FIG. 4 is a flowchart illustrating steps of enabling wireless services from a wireless service provider according to an exemplary embodiment of the present invention.

Referring now to FIG. 4, it illustrates an exemplary flowchart 400 showing how a channel requiring payment is enabled for viewing. The process is described with reference to the system 100 of FIG. 1. Enabling in the exemplary embodiment is accomplished mostly by means of the master controller 111 in the CSSC 110 and the content enforcer 125 in a receiver 120.

The process starts at step 401, and at step 403, the master controller 111 periodically checks if a city-pair has been entered. A city-pair can be entered through the operator's console connected to the master controller 111. A city-pair represents a predefined route, which should be stored in the memory accessible by the master controller 111. If a city-pair has not been entered, each receiver 120 through its content enforcer 125 can offer pre-sell of satellite services from a particular satellite service provider, such as DirecTV®, as a package, but not on a channel by channel basis, at step 405. At step 405, the content enforcer 125 may receive from a user purchase of wireless services. A passenger makes a purchase by using an RCU and the purchase is received by the corresponding RCU receiver 128 of the receiver 120 serving the passenger. The user should also pay the purchase by using the corresponding credit card reader. The pre-sell can be offered through an OSD displayed by the content enforcer 125 of each receiver 120. The content enforcer 125 passes the purchase information to the master controller 111, so that the master controller 111 keeps a record of the purchase and instructs the content scheduler 112 to create and/or update the enforcing data, which may include the enforcer tables associated with that receiver 120, so that the content enforcer 125 allows the satellite services to be shown in an EPG. As stated previously, a passenger may pay the service by using a credit card reader coupled to the corresponding receiver 120.

It should be noted that at this stage, even though the satellite signals are present and the aircraft is within the regulated coverage area of the satellite service provider, the passenger still cannot view a purchased satellite channel because it is unsure whether the airline can offer the satellite services, for example, whether it is allowed under the contract with the satellite service provider. Furthermore, without the city-pair information, the master controller 111 is unable to construct route information and cannot determine whether full service (the entire services/channels) or partial service (part of the entire services/channels) can be offered, and whether the satellite services, if offered, are offered throughout the flight or just parts of the flight. If a partial service is offered, or the satellite services are offered only parts of the flight, passengers should be forewarned and the price should be discounted.

Once the aircraft door closes and the city-pair information should be available and the process proceeds to step 407, where the master controller 111 determines whether the airline is allowed to offer the satellite services in this route. A data structure stored in the memory of the master controller 111 should contain information regarding city-pairs and the respective information on whether satellite services from a particular satellite service provider can be offered, and if the satellite services can be offer, what services or channels can be offered.

If the satellite services are not allowed to offer in this city-pair, the process proceeds to step 409 where the master controller 111 refunds passengers who have purchased the satellite package, instructs the content scheduler 112 to update the enforcer tables and instructs the receivers 120 associated with those passengers to inform the passengers that the satellite services are not offered in this flight, and the purchased have been refunded, via, for example, an OSD.

If the master controller 111 determines at step 407 that the satellite services can be offered, the process proceeds to step 411, in which the master controller determines whether full wireless service including all channels can be offered. If only partial service can be offered, the master controller 111 should provide a discount or partial refund to all the purchasers, instructs the content scheduler 112 to update the enforcer tables, and instructs the receivers 120 associated with those passengers to provide a message, for example, displaying an OSD, informing the passengers that some satellite services are not offered in this flight, and the purchased have been discounted.

When the master controller 111 has discounted the price at step 413 or determines that the entire satellite services can be offered in the flight, the process proceeds to step 415, in which the master controller 111 instructs each receiver 120 to continue to offer pre-sell of the satellite package. The aircraft at this point should be ready to take off, should be taking off, or should be flying already.

The master controller 111 then checks whether the aircraft is within a regulated coverage area at step 417. If the master controller 111 determines that the aircraft is outside of regulated coverage areas, it waits for a predetermined period of time, which may be entered by an operator. The master controller 111 then checks purchased status from each receiver 120 at step 421. If a passenger has not made a purchase, the master controller 111 instructs the associated receiver 120 to offer the pre-sell. In any case, the master controller 111 continues to check whether the aircraft is within a regulated coverage area at step 417.

If the master controller 111 determines that the aircraft is within a regulated coverage area, the master controller 111 determines if the satellite signal is present at step 423. As discussed previously, a satellite tuner and demodulator 104 can determine that the satellite signals are present if it can lock to a transponder. If it can, the satellite tuner and demodulate 104 should inform the master controller 111 and/or the receivers 120 that the satellite signals are present. If a satellite tuner and demodulator 104 cannot lock to a transponder, it should also inform the master controller 111 and/or the receivers 120 through the local network that the satellite signals are not present.

If the master controller 111 determines that the satellite signals are not present, the master controller 111 waits for a pre-determined interval at step 427 and then checks the signals again at step 423. If the master controller 111 determines that the satellite signals are present, the master controller 111 may instruct the content scheduler to update the enforcer tables, so that the satellite services can be displayed in an EPG. At this point, if a passenger selects a channel to view, the content enforcer 125 of the associated receiver 120 checks its enforcer table to see if that channel has been purchased at step 427. If the channel has been purchased, the content enforcer 125 enables the channel to be viewed by the passenger at step 431 by instructing the RTSP client 126 to construct and send out a RTSP tuning request. The RTSP tuning request is received by the RTSP server 106, which will respond with a multicast group address for the logical tuner 121 to tune to the request channel by joining the multicast.

If a content enforcer 125 determines that the channel has not being purchased, the content enforcer 125 makes an offer via, for example, an OSD, for the passenger to purchase the channel. Since the satellite signal is present, the sale can be offered as a package or on a channel by channel basis.

The flowchart is only exemplary and does not show whether a receiver 120 is forced to acquire the satellite EPG streams through a full or partial reboot and whether it uses cached EPG objects. These situations have been illustrated in the various embodiments described earlier. Although, in FIG. 4, the satellite services are offered as a separate package from that of local services, the sale can be offered as a package including both local and satellite services.

It should be noted that at some point, it will be too late for a passenger to purchase a service because e.g., the flight will be landing soon. The master controller 111 should instruct the content schedule 112 to update enforcer tables when the estimated arrival time is within a pre-defined amount, for example, 30 minutes, so that satellite channels are no longer available for purchase.

Although FIG. 4 shows that the out of coverage (OOC) operation is a function four parameters: the regulatory boundary, city-pair, signal lock or strength, and the GPS position, other parameters, such heading and altitude, can be considered to further qualify the transition as an airplane either moves into or out of the regulated coverage area. For example, these two parameters can be used to minimize the undesirable effect of turning satellite services off and on when an airplane is flying along the boundary of the regulated coverage area.

The invention claimed is:

1. A method for providing video service in a mobile content distribution system capable of receiving wireless broadcast channels from a wireless service provider, said method comprising:
receiving from a user purchase of wireless services including one or more broadcast channels provided by a wireless service provider;
receiving by a processor, information indicative of a route of said mobile content distribution system for moving from an originating location to a destination location; and
determining by a processor, if said content distribution system is authorized to receive services from said wireless service provider according to said information; and
if said content distribution system is not authorized based on said determining step to receive services from said wireless service provider according to said information, providing a refund to said user.

2. The method of claim 1, further comprising steps of:
if said mobile content distribution system is authorized to receive services from said wireless service provider according to said information, determining if said mobile content distribution system is authorized to provide full service from said wireless service provider according to said information; and
if said mobile content distribution system is not authorized to provide full service, providing a partial refund to said user.

3. The method of claim 2, further comprising steps of:
if said mobile content distribution system is within an area authorized to receive services from said wireless service provider, determining if signals from said wireless service provider are present; and
if said signals are present and said user has selected one of the purchased channels, enabling playback of signals from said selected channel.

4. The method of claim 3, further comprising a step of:
if said signals are present and said selected channel is not one of the purchased channels, offering said user to purchase said selected channel.

5. The method of claim 1, further comprising a step of if said mobile content distribution system is not within an authorized area, offering said user to purchase said wireless services.

6. A mobile content distribution system, said system comprising:
a wireless service gateway for receiving broadcast signals from a wireless service provider;
a system controller for controlling a plurality of receivers;
a local network connecting said wireless service gateway, said system controller, and said receivers; and
wherein one of said receivers receives from a user purchase of one or more broadcast channels provided by said wireless service provider, said system controller receives information indicative of a route of said mobile content distribution system for moving from an originating location to a destination location, determines if said system is authorized to receive services from said wireless service provider according to said information, and provides a refund to said user if said system is not authorized to receive services from said wireless service provider according to said information.

7. The mobile content distribution system of claim 6, wherein if said system is authorized to receive services from said wireless service provider, said system controller determines if said system is authorized to provide full service from said wireless service provider according to said information and if said system is not authorized to provide full service, said system controller provides a partial refund to said user.

8. The mobile content distribution system of claim 7, wherein if said mobile content distribution system is within an area authorized for said mobile content distribution system to receive services from said wireless service provider, said system controller is operative to determine if signals from said wireless service provider are present and if said signals are present and said user has selected one of the purchased channels, said one of said receivers is enabled to play back of signals from said selected channel.

9. The mobile content distribution system of claim 8, wherein if said signals are present and said user has not purchased said selected channel, said one of said receivers presents an offer for said user to purchase said selected channel.

10. The mobile content distribution system of claim 6, if said mobile content distribution system is within an area authorized for the mobile content distribution system to receive services from said wireless service provider, said one of said receivers is operative to present an offer to said user to purchase said wireless services.

* * * * *